United States Patent
Gould (10) Patent No.: US 10,272,463 B2
(45) Date of Patent: Apr. 30, 2019

(54) NON-IMPACT JETTING DISPENSING MODULE AND METHOD

(71) Applicant: NORDSON CORPORATION, Westlake, OH (US)

(72) Inventor: Mark A. Gould, Gainesville, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/504,291

(22) PCT Filed: Aug. 12, 2015

(86) PCT No.: PCT/US2015/044750
§ 371 (c)(1),
(2) Date: Feb. 15, 2017

(87) PCT Pub. No.: WO2016/032746
PCT Pub. Date: Mar. 3, 2016

(65) Prior Publication Data
US 2017/0282205 A1 Oct. 5, 2017

Related U.S. Application Data (60) Provisional application No. 62/042,924, filed on Aug. 28, 2014.

(51) Int. Cl.
*B05C 5/02* (2006.01)
*C09J 5/00* (2006.01)
*B05C 11/10* (2006.01)

(52) U.S. Cl.
CPC .......... *B05C 5/0229* (2013.01); *B05C 5/0225* (2013.01); *B05C 11/1034* (2013.01);
(Continued)

(58) Field of Classification Search
CPC ... B05C 5/0229; B05C 5/0225; B05C 5/0237; B05C 11/1042; B05C 11/1034; B05C 5/02; B05C 5/001
(Continued)

(56) References Cited

U.S. PATENT DOCUMENTS 2,025,509 A * 12/1935 Hieber ................. B23K 3/0615
219/542
4,465,212 A * 8/1984 Boone ..................... B05B 1/306
222/504
(Continued)

FOREIGN PATENT DOCUMENTS

CN 1669373 9/2005
CN 101511491 A 8/2009
(Continued)

OTHER PUBLICATIONS

International Patent Application No. PCT/US2015/044750: International Preliminary Report dated Feb. 28, 2017, 5 pages.
(Continued)

*Primary Examiner* — Charles Cheyney
(74) *Attorney, Agent, or Firm* — Baker & Hostetler LLP (57) ABSTRACT

A jetting dispensing module includes a module body with a fluid bore. A nozzle element is coupled to the module body. The nozzle element includes a fluid reservoir communicating with the fluid bore of the module body and a dispensing passage. A guide element includes a main guide bore and an internal fluid space in fluid communication with the fluid bore. A plunger is mounted for reciprocating movement within the module body. The plunger extends through the main guide bore and into the internal fluid space, and includes a distal end moveable between a fully retracted
(Continued)

position spaced from the fluid reservoir and a fully extended position within the fluid reservoir but out of contact with the nozzle element.

18 Claims, 7 Drawing Sheets

(52) U.S. Cl.
CPC ............. *B05C 11/1042* (2013.01); *C09J 5/00* (2013.01); *B05C 5/0237* (2013.01)

(58) Field of Classification Search
USPC ..... 222/420, 504, 559, 146.5, 325, 518, 333
See application file for complete search history.

(56) References Cited

U.S. PATENT DOCUMENTS

| | | | | |
|---|---|---|---|---|
| 4,784,582 | A * | 11/1988 | Howseman, Jr. .... | H05K 3/3484 222/378 |
| 4,962,871 | A * | 10/1990 | Reeves ................. | B05C 5/0225 222/504 |
| 5,207,352 | A * | 5/1993 | Porter .................. | B05B 12/087 222/1 |
| 5,934,520 | A * | 8/1999 | Byerly ................. | B05C 5/0225 222/325 |
| 6,257,445 | B1 * | 7/2001 | Means .................. | B05C 5/0225 222/1 |
| 6,499,629 | B1 * | 12/2002 | Colangelo ............... | B05C 5/001 222/146.5 |
| 7,767,266 | B2 | 8/2010 | Holm et al. | |
| 7,980,197 | B2 * | 7/2011 | Prentice ................ | B05C 5/0225 118/243 |
| 8,424,720 | B2 * | 4/2013 | Tracy ...................... | F04B 15/02 222/1 |
| 8,708,246 | B2 | 4/2014 | Dunlap et al. | |
| 8,753,713 | B2 | 6/2014 | Clark et al. | |
| 9,144,818 | B2 * | 9/2015 | Doyle ................... | B05C 5/0225 |
| 2005/0167519 | A1 | 8/2005 | Holm et al. | |
| 2012/0205392 | A1 | 8/2012 | Fiske et al. | |

FOREIGN PATENT DOCUMENTS

| | | |
|---|---|---|
| EP | 0509323 A2 | 10/1992 |
| EP | 2764925 A1 | 8/2014 |
| JP | 88-006211 B2 | 2/2007 |
| JP | 3886211 B2 | 2/2007 |

OTHER PUBLICATIONS

European search report dated Mar. 14, 2018 for EP Application No. 15835801.
CN Office Action dated Aug. 22, 2018 for CN Application No. 201580046391.

\* cited by examiner

NON-IMPACT JETTING DISPENSING MODULE AND METHOD

CROSS-REFERENCE TO RELATED APPLICATIONS

This application is a U.S. National Stage of International Patent App. No. PCT/US2015/044750, filed Aug. 12, 2015, which claims priority to U.S. Provisional App. No. 62/042,924, filed Aug. 28, 2014, the disclosures of which are incorporated by reference in their entirety.

FIELD OF THE INVENTION

The present invention generally relates to dispensing devices and, more particularly, to devices for jetting droplets of fluid material.

BACKGROUND

Liquid dispensers for jetting fluid materials such as hot melt, are known in the art. These dispensers generally operate to dispense small volumes of fluid material to a substrate by rapidly impacting a valve seat with a valve member to create a distinct, high pressure pulse that ejects a small volume of fluid material from the dispenser. With repeated use, however, the impact between the valve member and the valve seat can cause wear or damage to either or both of those components in a manner that alters the dispensing characteristics of the dispenser. Impact between the valve member and the valve seat also generally requires that higher cost materials be used for one or both of these valve components.

Therefore, a need exists for improvements relating to dispensers for jetting fluid materials.

SUMMARY

Generally, in an illustrative embodiment a jetting dispensing module is provided for jetting droplets of fluid material. The module includes a module body with a fluid bore. A nozzle element is coupled to the module body. The nozzle element includes a fluid reservoir communicating with the fluid bore of the module body and a dispensing passage. A guide element includes a main guide bore and an internal fluid space in fluid communication with the fluid bore. A plunger is mounted for reciprocating movement within the module body. The plunger extends through the main guide bore and into the internal fluid space, and is moveable between a fully retracted position in which a distal end of the plunger is spaced from the fluid reservoir and a fully extended position in which the distal end is positioned within the fluid reservoir but out of contact with the nozzle element. A droplet of the fluid material is jetted out of the fluid reservoir and through the dispensing passage as the plunger moves from the fully retracted position to the fully extended position.

In one embodiment the nozzle element and the guide element are separate components. In an alternative embodiment the nozzle element and the guide element are formed as a single, integral component. The plunger may further comprise a cylindrical distal portion and the main bore of the guide element as well as the fluid reservoir further comprise aligned, cylindrical bores that receive the cylindrical distal portion.

A method for jetting droplets of fluid material from the jetting dispensing module is also provided. The method may generally comprise filling the fluid reservoir with the fluid material by directing the fluid material from the fluid bore to the fluid reservoir through a passageway at least partially defined by the guide element. The plunger is moved from a fully retracted position to a fully extended position such that a distal end of the plunger extends into the fluid reservoir. The plunger is stopped before the distal end of the plunger contacts the nozzle element. A droplet of the fluid material in the fluid reservoir is jetted through and out of the dispensing passage as the plunger moves from the fully retracted position to the fully extended position.

Various additional features and advantages of the invention will become more apparent to those of ordinary skill in the art upon review of the following detailed description of the illustrative embodiments taken in conjunction with the accompanying drawings.

DETAILED DESCRIPTION

Figure 1:
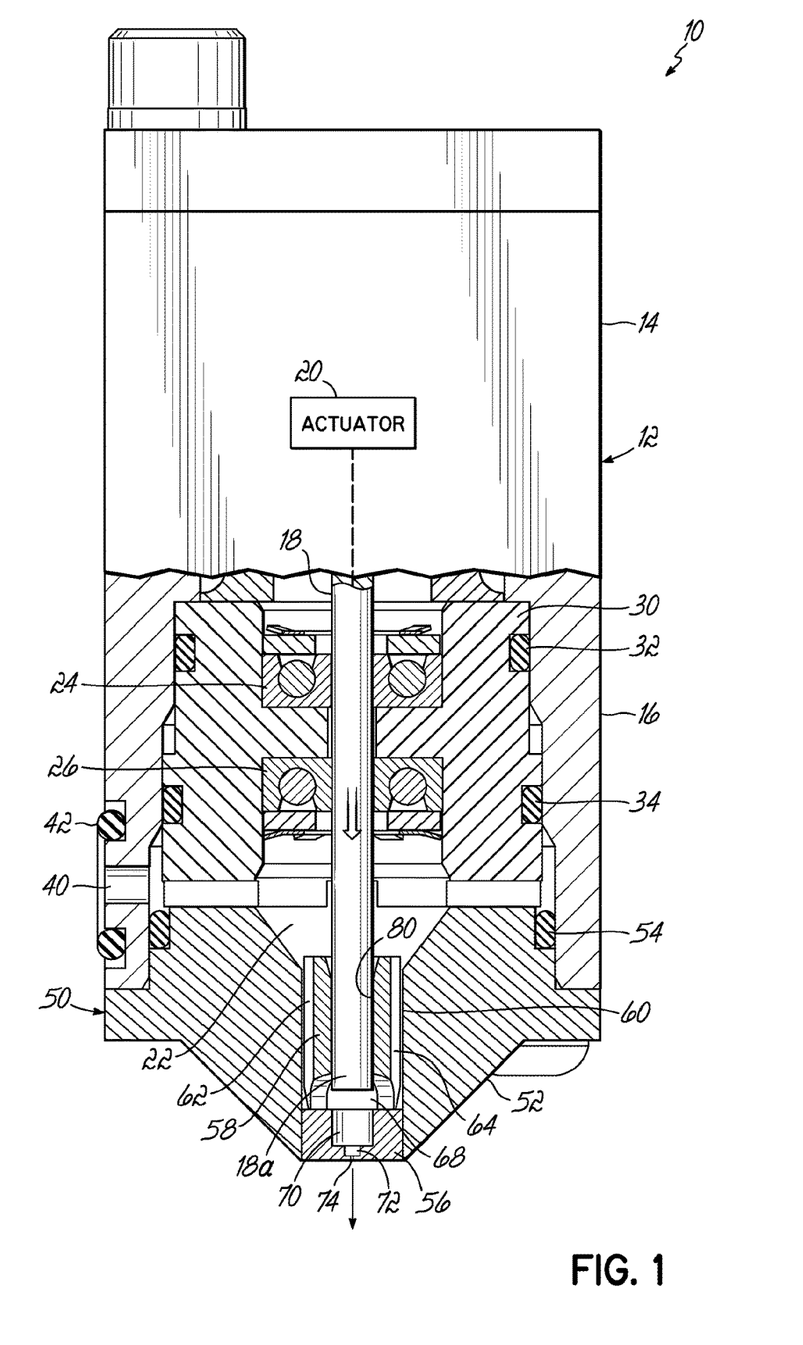
FIG. 1 is dispensing module, partially in cross section, and illustrating a first embodiment of the invention.

FIG. 1 illustrates a dispensing module 10 constructed in accordance with an illustrative embodiment of the invention for dispensing viscous fluid materials such as hot melt adhesive. The module 10 includes module body 12 generally including an actuating portion 14 and a dispensing portion 16. The actuating portion 14 is not shown in detail, as one of ordinary skill in the art will recognize the actuating portion may comprise several different types of alternative actuators, including pneumatic, electric actuators, piezoelectric actuators or mechanical actuators depending on the desired dispensing characteristics and application needs. The actuating portion 14 operates to reciprocate a plunger 18 through a stroke. The plunger 18 is coupled to an actuator 20 and reciprocates within a fluid bore 22. First and second dynamic seal assemblies 24, 26 are provided along the plunger 18 for sealing the actuating portion 14 and the dispensing portion 16 and, more specifically, the fluid bore 22 of the module body 12. The dynamic seals 24, 26 are spring loaded lip seals fixed within a seal supporting structure 30 which is mounted within the module body 12 and likewise is sealed by respective O-ring seals 32, 34. The fluid bore 22 receives fluid material, such as hot melt adhesive, or other viscous fluid material through an inlet port 40 which may be sealed by another O-ring seal 42 in order for it to be fluidly coupled to another fluid component such as a manifold (not shown). The dispensing module 10 further comprises a nozzle assembly 50 fixed to the module body 12. The nozzle assembly 50 includes a nozzle body 52 sealed to the module body by an O-ring 54 or other seal, as well as a nozzle element 56 and a plunger guide element 58. The nozzle element 56 and the plunger guide element 58 are each press fit within a central bore 60 of the nozzle body 52. There is a close but non-contact fit between the distal portion 18a of the plunger 18 and the fluid reservoir 70.

Referring now to FIG. 1 in conjunction with FIGS. 2A, 2B, 3 and 3A, the plunger guide element 58 is a generally triangular element which includes flat sides 58a, 58b, 58c. These flat sides 58a, 58b, 58c provide fluid passageways 62, 64 (only two of three shown) between the fluid bore 22 and an internal space 68 of the plunger guide element 58. This internal space 68 of the plunger guide element 58 communicates with a cylindrical fluid reservoir 70 in the nozzle element 56. The nozzle element 56 further includes a smaller cylindrical bore 72 which then communicates with a distal dispensing passage 74.

Figure 2A:
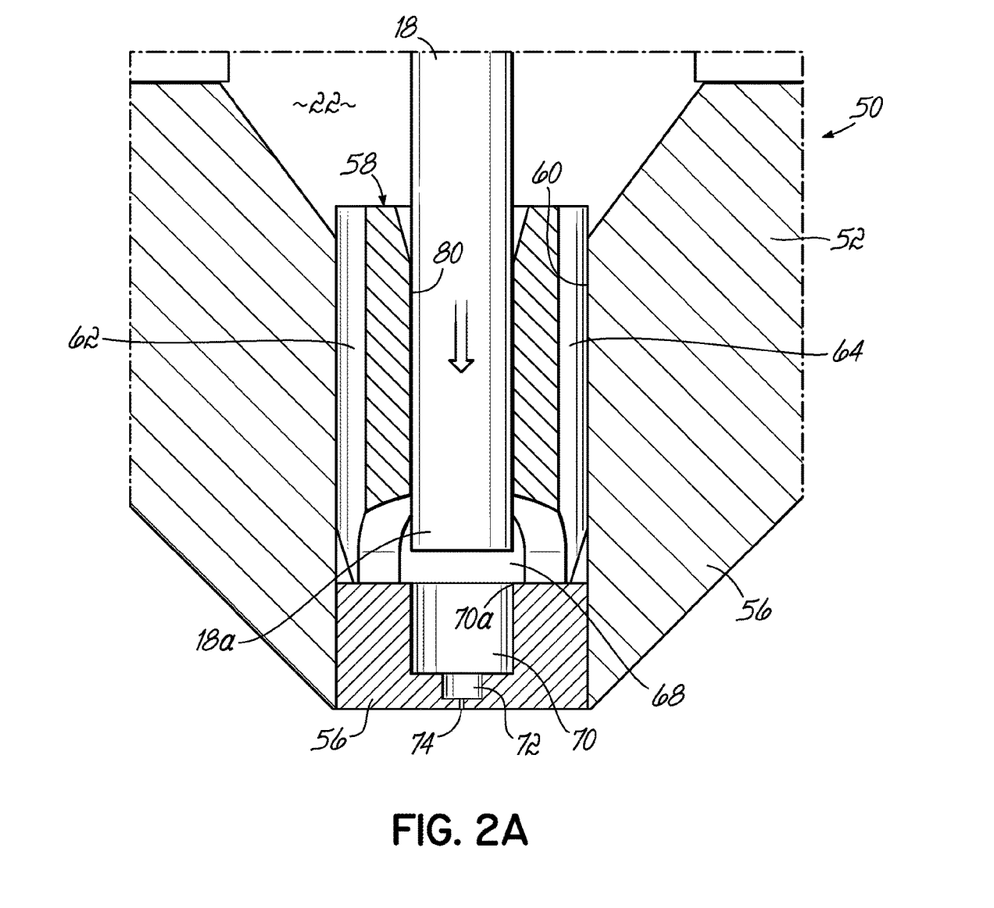
FIG. 2A is an enlarged view of the dispensing tip portion of the module shown in FIG. 1, and showing the plunger in a retracted position at one end of a stroke.
Figure 2B:
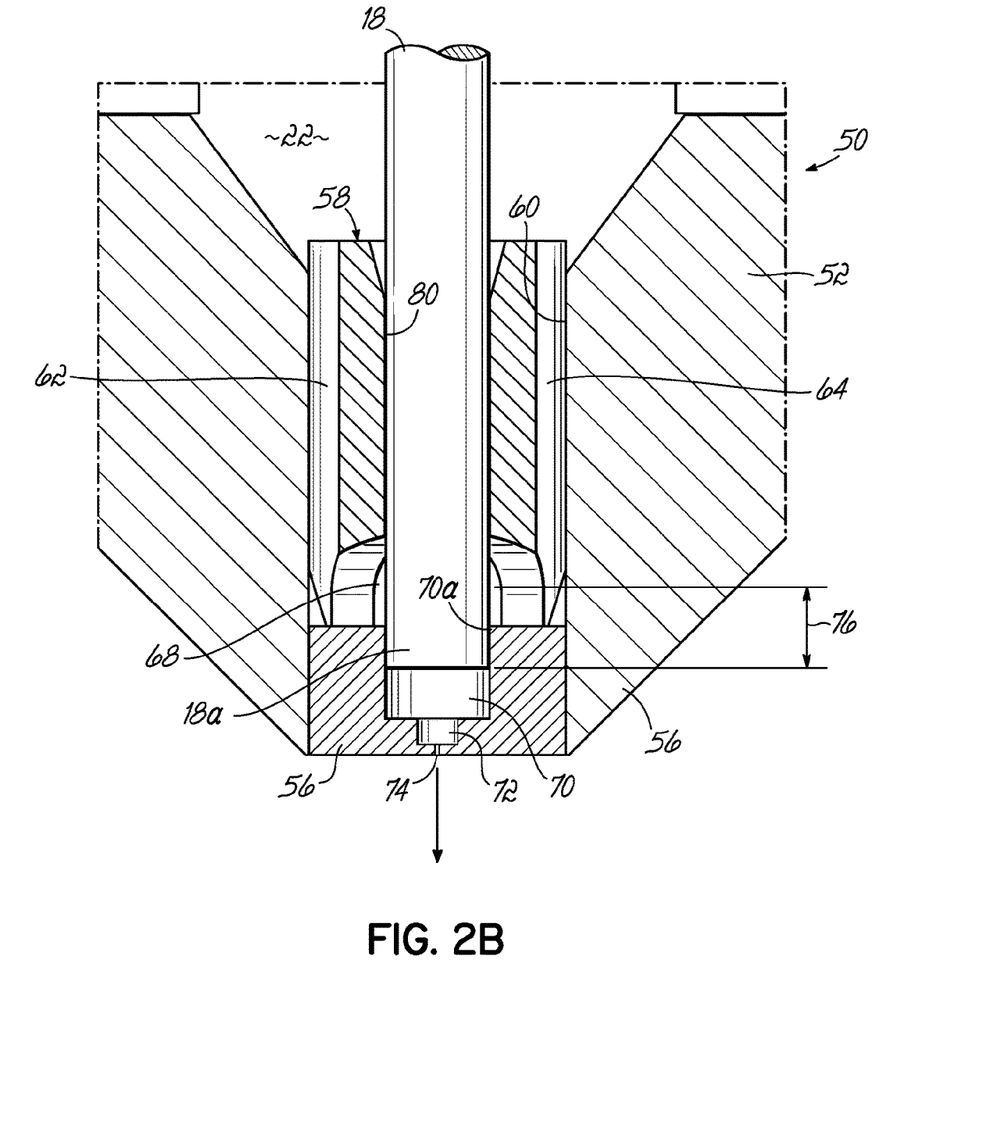
FIG. 2B is a view similar to FIG. 2A, but illustrating the plunger in a forwardmost position at the other end of its stroke for dispensing a jet of fluid material.
Figure 3:
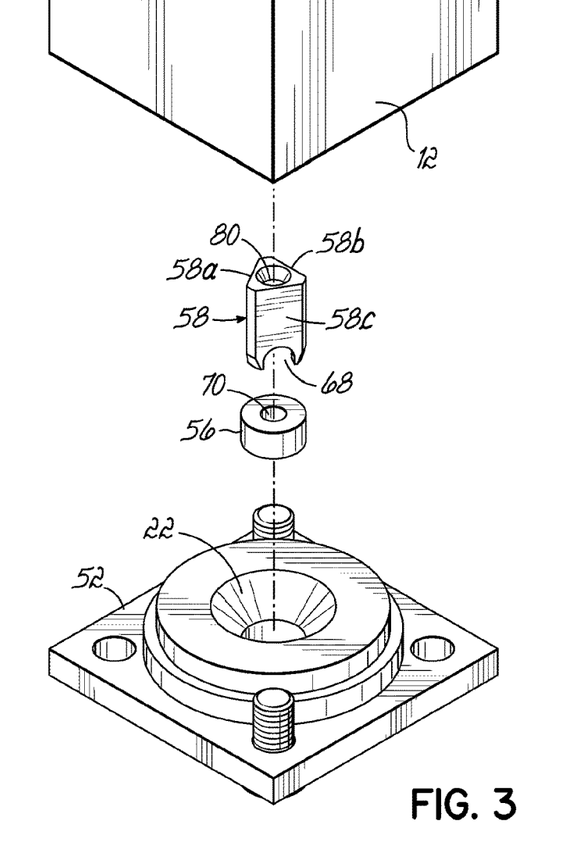
FIG. 3 is a disassembled perspective view of the dispensing module shown in FIG. 1.
Figure 3A:
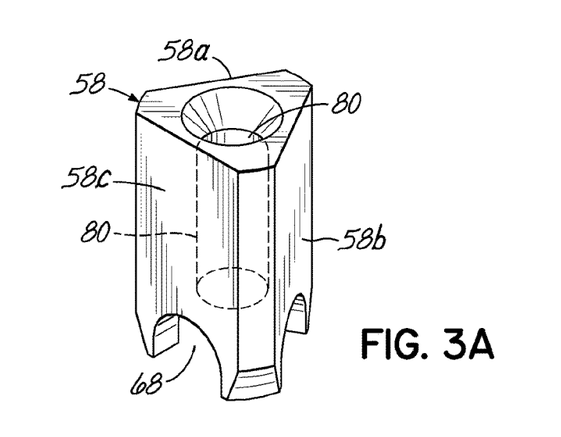
FIG. 3A is a perspective view of a plunger guide element used in the dispensing module of FIG. 1.
Figure 4:
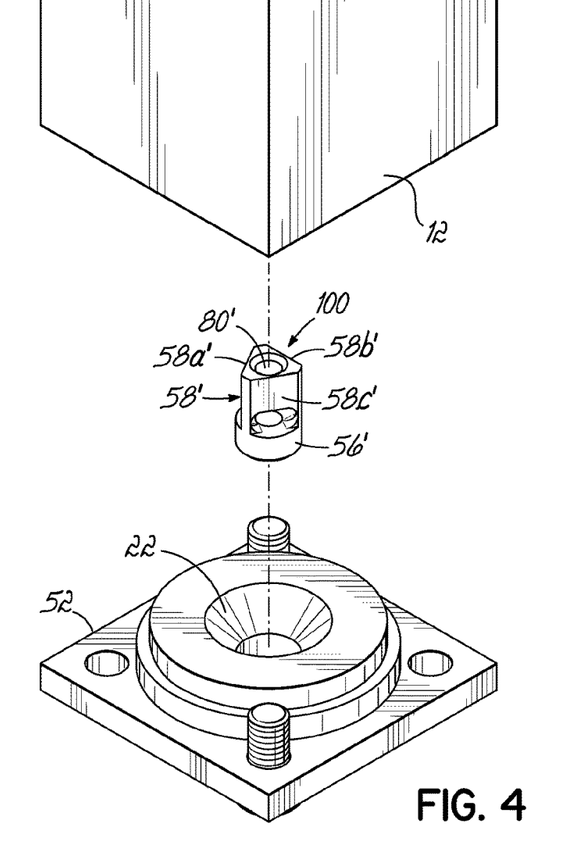
FIG. 4 is a disassembled view similar to FIG. 3, but illustrating an alternative embodiment of the nozzle and guide element.
Figure 4A:
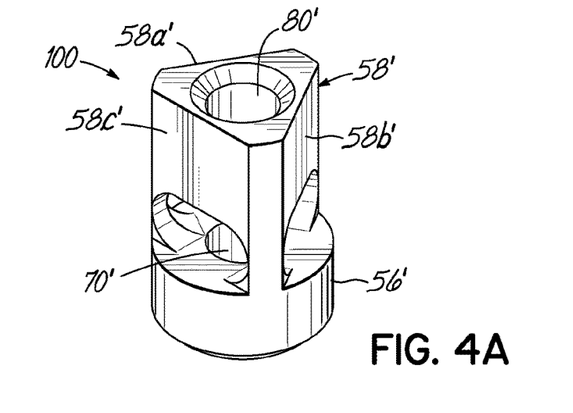
FIG. 4A is a perspective view illustrating the alternative nozzle and guide element shown in FIG. 4.

The plunger 18 moves between a fully retracted position at one end of its stroke, shown in FIG. 2A, and a fully extended or forwardmost position at the opposite end of its stroke, shown in FIG. 2B. When the plunger 18 is in the fully retracted position shown in FIG. 2A, the fluid material from the fluid bore 22 travels through the passageways 62, 64 created by the flat sides 58a, 58b, 58c of the guide element 58 into the internal fluid space 68 of the guide element 58 and into the fluid reservoir 70 and bore 72 of the nozzle element 56. As the plunger 18 moves from the retracted position in FIG. 2A to the fully extended or forwardmost position of FIG. 2B a small amount of the fluid material is jetted through the dispensing passage 74. The full stroke is denoted by arrow 76 in FIG. 2B. In accordance with the invention, the distal portion 18a of the plunger 18 does not make contact with the nozzle element 56, or with any other element, such as a valve seat, during or after it moves and stops at the fully extended position. In order to continuously force the fluid material into the internal space 68, fluid reservoir 70 and bore 72 when the plunger 18 is in the retracted position, the fluid material is maintained under slight pressure, such as between 15 psi and 20 psi in the fluid bore 22. In this embodiment, the guide element 58 and the nozzle element 56 comprise two separate components that are each pressfit into the nozzle body 52. A central main bore 80 of the guide element 58 receives the plunger 18 for reciprocating movement therein. This bore 80, and the fluid reservoir 70 of the nozzle element 56 are precisely aligned and dimensioned so that the plunger 18 can move from the retracted position to the extended position while maintaining a very slight clearance between the outer surface of the plunger 18 and the inner surfaces of the central guide element bore 80 and the cylindrical fluid reservoir 70.

Figure 5A:
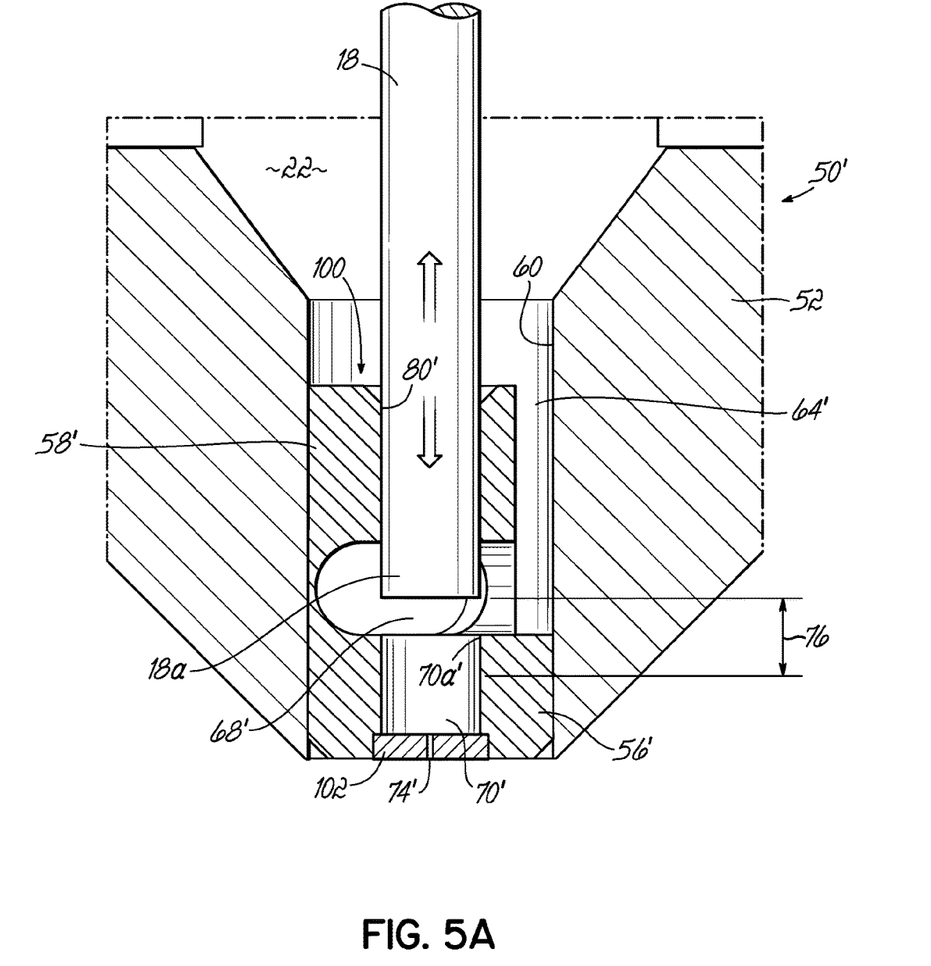
FIG. 5A is an enlarged view of the dispensing tip portion similar to FIG. 2A, but showing use of the alternative nozzle and guide element of FIGS. 4 and 4A.
Figure 5B:
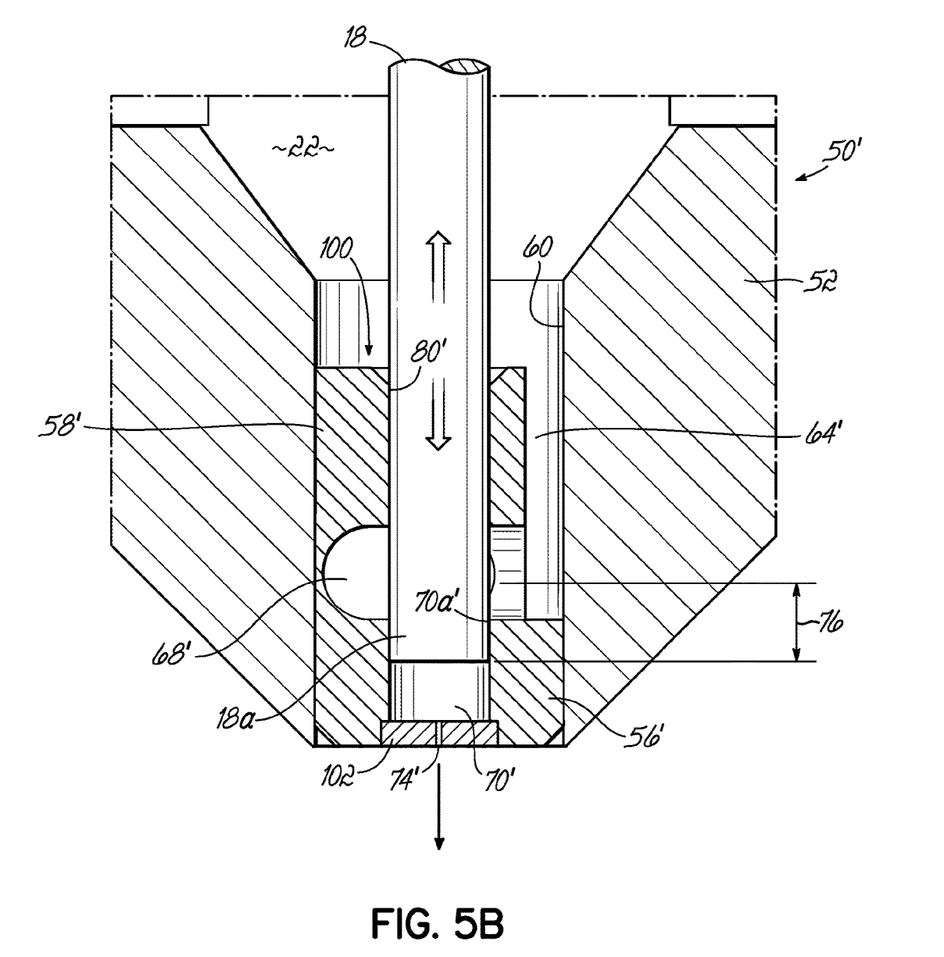
FIG. 5B is an enlarged view of the dispensing tip portion similar to FIG. 2B, but showing use of the alternative nozzle and guide element of FIGS. 4 and 4A.

FIGS. 4, 4A, 5A and 5B illustrate an alternative embodiment of a dispensing module 10'. In these figures, like elements of the first and second embodiments are referenced with like numerals and therefore require no further description. Like numerals in the second embodiment that have prime (') marks denote corresponding elements of the first embodiment but having different function and/or design as will be described or as apparent from the drawings. In this embodiment, the only difference from the first embodiment is that the nozzle element 56 and the guide element 58 of the first embodiment have been combined into one integral guide and nozzle element 100, machined out of a single piece of metal or any other material, such as engineered plastic. The integral guide and nozzle element 100 includes a nozzle element 56' and a guide element 58'. The advantage of the guide and nozzle element 100 is that the accuracy and alignment between the main bore 80' of the guide element 58' and the cylindrical fluid reservoir 70' of the nozzle element 56' is maximized. In this regard, during manufacture, the main bore 80' and the fluid reservoir 70' may be formed with a single machining or drilling operation. The remaining cutouts in the integral component, such as the cut outs at the distal end of the guide element 58', forming the internal fluid space 68', may be formed through further machining operations. In this embodiment the nozzle element 56' includes a nozzle insert 102 having the dispensing passage 74'. The insert 102 may, for example, be formed of carbide or an industrial jewel material. The operation of the second embodiment is the same as in the first embodiment, described above. In this regard the operation is shown in FIGS. 5A and 5B with movement of the plunger 18 between the fully retracted position and the fully extended or forwardmost position shown in FIG. 5B and traveling through the full plunger stroke denoted by the arrow 76.

Referring now to FIGS. 2A and 2B in conjunction with FIGS. 5A and 5B, it will be noted that the reservoir 68 (or 68') has a large volume compared to the combined volumes of the bores 70, 72 and dispense passage 74 (or 70', 74'). Also, there is a close fit between the distal end 18a of the plunger 18 and the bore 70 (or 70'). When the plunger 18 is retracted, as shown in FIGS. 2A and 5A, the collective volumes of reservoir 68 (or 68'), bores 70, 72 and passage 74 (or 70', 74') are filled with the viscous fluid material. As the plunger 18 moves through its stroke 76 to the fully extended position shown in FIGS. 2B and 5B, backflow of fluid material can occur upwardly through passageways 62, 64 (or 64'). But, as the plunger distal end 18a moves into and through the bore 70 (or 70'), past edge 70a (or 70a'), a pressure build is generated by the force exerted on the plunger distal end 18a as it moves against the trapped, incompressible fluid in the bore 70 (or 70'). The result of this force is a small amount of the fluid material flowing upwardly through the small clearance between the plunger distal end 18a and the wall of the bore 70 (or 70'). The discharged amount of fluid flowing through passage 74, at high velocity, provides a dampening reaction force to the plunger distal end 18a.

The plunger stroke 76, including the portions thereof above and below the upper edge 70a of bore 70 (or edge 70a' of bore 70'), may be adjusted, for example, to produce smaller or larger amounts of fluid discharge from the passage 74 (or 74'). The edge 70a (or 70a') should be as sharp as possible in order to create an abrupt pressure build. Finally, the reverse movement of the plunger 18 and retraction of the distal end 18a from the bore 70 (or 70') will create a snuff back or suck back effect to help reduce or eliminate any dripping or drooling from the passage 74 (or 74') between dispense operations.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A jetting dispensing module for jetting droplets of fluid material, the jetting dispensing module comprising:
   a module body including a fluid bore;
   a nozzle element coupled to the module body, the nozzle element including a fluid reservoir communicating with the fluid bore of the module body and a dispensing passage;
   a guide element including a main guide bore, an internal fluid space in fluid communication with the fluid bore, and a plurality of flat sides that each include an opening at a distal end of the flat side that defines an independent fluid passageway between the fluid bore and the internal fluid space; and
   a plunger mounted for reciprocating movement within the module body, the plunger extending through the main guide bore and into the internal fluid space,
   wherein the plunger is moveable between a fully retracted position in which a distal end of the plunger is spaced from the fluid reservoir of the nozzle element, and a fully extended position in which the distal end is positioned within the fluid reservoir of the nozzle element but out of contact with the nozzle element, thereby jetting a droplet of the fluid material out of the fluid reservoir and through the dispensing passage as the plunger moves from the fully retracted position to the fully extended position.

2. The jetting dispensing module of claim 1, wherein the nozzle element and the guide element are separate components.

3. The jetting dispensing module of claim 1, wherein the nozzle element and the guide element are formed as a single, integral component.

4. The jetting dispensing module of claim 1, wherein the plunger further comprises a cylindrical distal portion and the main guide bore of the guide element as well as the fluid reservoir further comprise aligned, cylindrical bores that receive the cylindrical distal portion.

5. A method for jetting droplets of fluid material from a jetting dispensing module including a module body including a fluid bore containing fluid material, a plunger in the fluid bore, a guide element comprising a main guide bore receiving the plunger for reciprocating movement therein, an internal fluid space in fluid communication with the fluid bore, and a plurality of flat sides that each include an opening at a distal end of the flat side that defines an independent fluid passageway between the fluid bore and the internal fluid space, a nozzle element having a fluid reservoir, which also receives the plunger, the fluid reservoir communicating with the fluid bore and a dispensing passage, the method comprising:
   filling the fluid reservoir with the fluid material by directing the fluid material from the fluid bore to the fluid reservoir through each of the openings defined by the guide element;
   moving the plunger from a fully retracted position at which a distal end of the plunger is spaced from the fluid reservoir of the nozzle element, to a fully extended position such that the distal end of the plunger extends into the fluid reservoir of the nozzle element;
   stopping the plunger before the distal end of the plunger contacts the nozzle element; and
   jetting a droplet of the fluid material in the fluid reservoir through and out of the dispensing passage as the plunger moves from the fully retracted position to the fully extended position.

6. The jetting dispensing module of claim 1, further comprising an actuator coupled to the plunger and configured to reciprocate the plunger within the module body.

7. The jetting dispensing module of claim 6, wherein the actuator is a pneumatic actuator, an electric actuator, a piezoelectric actuator, or a mechanical actuator.

8. The jetting dispensing module of claim 1, further comprising first and second seal assemblies along the plunger within the fluid bore of the module body.

9. The jetting dispensing module of claim 1, wherein the fluid reservoir of the nozzle element is in fluid communication with the internal fluid space of the guide element.

10. The jetting dispensing module of claim 1, wherein the guide element is a triangular element and the plurality of flat sides includes three flat sides.

11. The jetting dispensing module of claim 1, wherein the fluid material is hot melt adhesive.

12. The method of claim 5, wherein moving the plunger from the fully retracted position to the fully extended position comprises moving the plunger using an actuator coupled to the plunger.

13. The method of claim 5, wherein the fluid material is hot melt adhesive.

14. The jetting dispensing module of claim 1, wherein:
   a clearance is provided between the plunger and each of the guide element and the nozzle element such that the distal end of the plunger does not make contact with the nozzle element as the plunger moves between the fully retracted position and the fully extended position, and
   the clearance is such that the distal end of the plunger also does not make contact with the guide element as the plunger moves between the fully retracted position and the fully extended position.

15. The method of claim 5, wherein:
   a clearance is provided between the plunger and each of the guide element and the nozzle element such that the distal end of the plunger does not make contact with the nozzle element as the plunger moves between the fully retracted position and the fully extended position, and
   the clearance is such that the distal end of the plunger also does not make contact with the guide element as the plunger moves between the fully retracted position and the fully extended position.

16. The method of claim 5, wherein the guide element is a triangular element and the plurality of flat sides includes three flat sides.

17. The jetting dispensing module of claim 1, wherein the guide element is polygonal-shaped.

18. The method of claim 5, wherein the guide element is polygonal-shaped.

* * * * *